US005174005A

United States Patent [19]

Somerville

[11] Patent Number: 5,174,005

[45] Date of Patent: Dec. 29, 1992

[54] LOCKING PULLER DEVICE

[76] Inventor: Dean S. Somerville, P.O. Box 246, Cooperstown, N. Dak. 58425

[21] Appl. No.: 894,942

[22] Filed: Jun. 8, 1992

[51] Int. Cl.[5] .............................. B23P 19/04

[52] U.S. Cl. .............................. 29/261

[58] Field of Search .............. 29/259, 260, 261, 262

[56] References Cited

U.S. PATENT DOCUMENTS 2,262,969 11/1941 Schultz .............................. 29/261

4,007,535 2/1977 Brandt et al. .............................. 29/261

4,649,615 3/1987 Hundley .............................. 29/261

*Primary Examiner*—Robert C. Watson

*Attorney, Agent, or Firm*—David A. Lingbeck

[57] ABSTRACT

The invention comprises of improvements in a locking puller device. The locking puller device has three pivotally mounted jaws and a cam ring which moves forward to pivot and lock the jaws about an object. The improvements comprise a flange-less, disk-like collar having axial slots therein to pivotally mount the jaws, a threaded sleeve which is threaded into a receiving member of the collar, and a T-handle which replaces the nut and which can be adjusted without a tool. These improvements vastly improve the strength and durability of the locking puller device and also are more user friendly. If the threads on the sleeve are damaged through use, the sleeve can be turned out of the collar and replaced with a new sleeve of various lengths, instead of having to also replace the collar which was fixed to the sleeve in the old locking puller devices.

1 Claim, 1 Drawing Sheet

20
22
22'
22"
23
23'
23"
24
24'
25
26
26"
27
27'
28
28'
28"
29
30
30'
31
38
38'
5

LOCKING PULLER DEVICE

BACKGROUND OF THE INVENTION

The present invention relates, in general, to locking puller devices for removing bearings and pullers as such.

While there are patents issued in this prior art, and some of them were issued to this inventor, there will always be a need to improve upon products and inventions publicly known and used, because of the ever increasing demand to do things more quickly at a cheaper cost and with improved quality. This is especially true with Locking Puller Devices. A review of the prior art does not suggest the important and useful improvements as described in the present invention.

Known prior arts relating to puller devices as such were found in the following issued patents: U.S. Pat. Nos. 1,569,918; 2,303,560; 2,889,617; 2,956,336; 4,007,535, 4,068,365. These prior arts do not have the improvements as the present invention. The prior arts as described in U.S. Pat. Nos. 4,007,535 and 4,068,365, in particular, were invented by this inventor. These prior arts relate to a locking puller device. The second of these two patents pertains to improvements made on the first patent. The first patent, U.S. Pat. No. 4,007,535, could not spread the arm-like jaws automatically. Whereas, in the second patent, the inventor improved upon his first invention by inventing additional elements which modified and were added to the first patent and which would spread the arm-like jaws automatically. In each of these two patents, the collar, where the arm-like jaws are mounted, have narrow flanges extending laterally from the collar. The arm-like jaws are pivotally mounted to these flanges. When the arm-like jaws are locked about an object and when force is applied to the shaft where the object is mounted to remove the object off the shaft, enormous stress is placed on the flanges. Occasionally, these flanges are damaged because of this stress, and as a result, the collar, from where the flanges extend, have had to be replaced along with the sleeve since the sleeve is fixed to the collar.

The present invention, which is an improvement over the inventions previously patented, has completely improved the collar, so that it will withstand the enormous stress that is placed on the collar and won't become damaged as the arm-like jaws are locked about an object and as the threaded rod is moved forward against the shaft of the object. This improvement is not an obvious improvement, because it was not known until after all the machining and testing of the new and improved collar as to whether or not the new collar would be able to withstand the stress and the force exerted on it unlike the old collar having the flanges.

Further, the known prior arts, specifically the two patents, U.S. Pat. Nos. 4,007,535 and 4,068,365, for which this invention is an improvement, have a sleeve fixed to the rearward side of the collar. The joint of where the collar and the sleeve meet fatigues and is often damaged, because of the force and stress placed on both the collar and sleeve as the locking device is used. As a result, the sleeve has literally broken away from the collar, and both the sleeve and the collar have had to be replaced.

Additionally, the two patents, U.S. Pat. Nos. 4,007,535 and 4,068,365, have a sleeve which is threaded. From time to time, the threads on the sleeve become damaged, and the nut which is threaded on the sleeve cannot move along the sleeve thus making the locking device inoperable. The sleeve must be replaced so that the nut can move along the sleeve in order for the locking device to function at all. But, instead of just replacing the sleeve, the collar and the sleeve all have to be replaced, even though the collar is not damaged. This present invention overcomes this problem. The sleeve, in the present invention, is not fixed to the collar, but can be easily removed from the collar and replaced with a new sleeve should the sleeve become damaged in some way.

There is a definite need for a new and improved locking device which overcomes all of the problems noted above.

SUMMARY OF THE INVENTION

The present invention relates to a new and improved locking puller device. This inventor first patented the locking puller device on Feb. 15, 1977 and again patented it on Jan. 17, 1978. This new and improved locking puller device has the same elements as the locking puller device patented on Jan. 17, 1978, except the nut threaded on the sleeve is now replaced with a T-handle. The present invention has a collar which is substantially shaped like a disk. This new collar has much more mass and covers a much greater area than the old collar and doesn't have flanges laterally extending from the collar. This new collar has three axial slots extending therein, which are substantially equally spaced about the collar. Further, this new collar has three passages extending through its wall. Each passage intersects one slot. These passages receive pins for mounting three arm-like jaws in the slots. The rearward side of the collar has a receiving member extending therefrom. A threaded sleeve is threaded into the receiving member of the collar. A threaded rod, used to urge rearward movement of an object relative to the shaft after the plurality of arm-like jaws are locked about the object, extends through the sleeve and is threaded through the collar.

The plurality of arm-like jaws are rearwardly and rotatably mounted in the slots of the collar using pins which are inserted in through the passages. Each arm-like jaw has rails laterally extending from and longitudinally along the edges of its outer surface. A cam ring, having a three pairs of lugs radially extending inwardly and about the rails of the arm-like jaws, slidably surrounds the arm-like jaws. Three braces each having one end attached to the cam ring, extends rearwardly and has the other end attached to a ring which is rotatably mounted to the T-handle.

This device is used to pull such objects as the inner race of a bearing, gear, or sprocket off of shafts. This is accomplished by turning the T-handle forward, which causes the cam ring to cam down on the jaws thus locking the jaws about the object. The object is removed from the shaft by turning the threaded rod forward to engage the shaft and urging rearward movement of the object relative to the shaft. After the object is removed, the jaws are unlocked by the rearward movement of the T-handle which causes the cam ring to move rearwardly, causing the lugs to engage the inner surfaces of the rails.

It is the object of this invention to produce a locking puller device which is superior in strength to the other locking puller devices. The new and improved collar is a flange-less, disk-like structure. It has more mass and area than the old collar in the prior art. It doesn't have the flanges which were a part of the old collar and which are not nearly as strong and durable as the flange-less, disk-like structure. The flanges would break and crack under stress. There was no support nor mass to either side of the flanges to give the flanges strength unlike that in the present invention.

Further, the joint of the collar and the sleeve in the prior art isn't as strong as that of the new sleeve and the new collar in the present invention. The sleeve was fixed to the collar in the prior art. The joint of the sleeve and the collar in the prior art would easily fatigue, and the sleeve would crack and break apart from the collar. This problem won't happen with the new sleeve and the new collar in the present invention. The new sleeve is threaded into the receiving member of the new collar. They are not fixed to each other, so there isn't anything to fatigue.

Another object of this invention is to produce a locking puller device which is more adaptable and functional for the user. Since the new sleeves are now removable from the collar, different length sleeves could be used on the same locking puller device. Further, instead of having to replace both the sleeve and the collar if only one or the other was damaged, only the one which was actually damaged needs to be replaced. With the old collar and the old sleeve, both would have to be replaced even if only the sleeve or the collar was damaged, not both. Since the sleeve is threaded, the threads on the sleeve do become damaged through use, making the device inoperable. Instead of having to replace both the sleeve and the collar, only the sleeve need be replaced, and this can be easily accomplished by removing the sleeve from the receiving member of the collar. The same can be said if only the collar was damaged. Only the collar need be replaced.

Yet another objective of this invention is to produce a locking puller device which is more user friendly. In the prior art, the nut was used to move the cam ring forwardly and rearwardly. The user would need a tool to move the nut which would then move the cam ring. However, in the present invention, the T-handle is now used. The T-handle can be turned or adjusted by hand without the aid of tools. The user need not have to worry about getting the right-sized tool to move the cam ring.

Further objects and advantages of the present invention will become apparent as the description proceeds and when taken in conjunction with the accompanying drawing wherein:

DETAILED DESCRIPTION OF THE INVENTION

Figures 1, 2, 3, 4, 5:
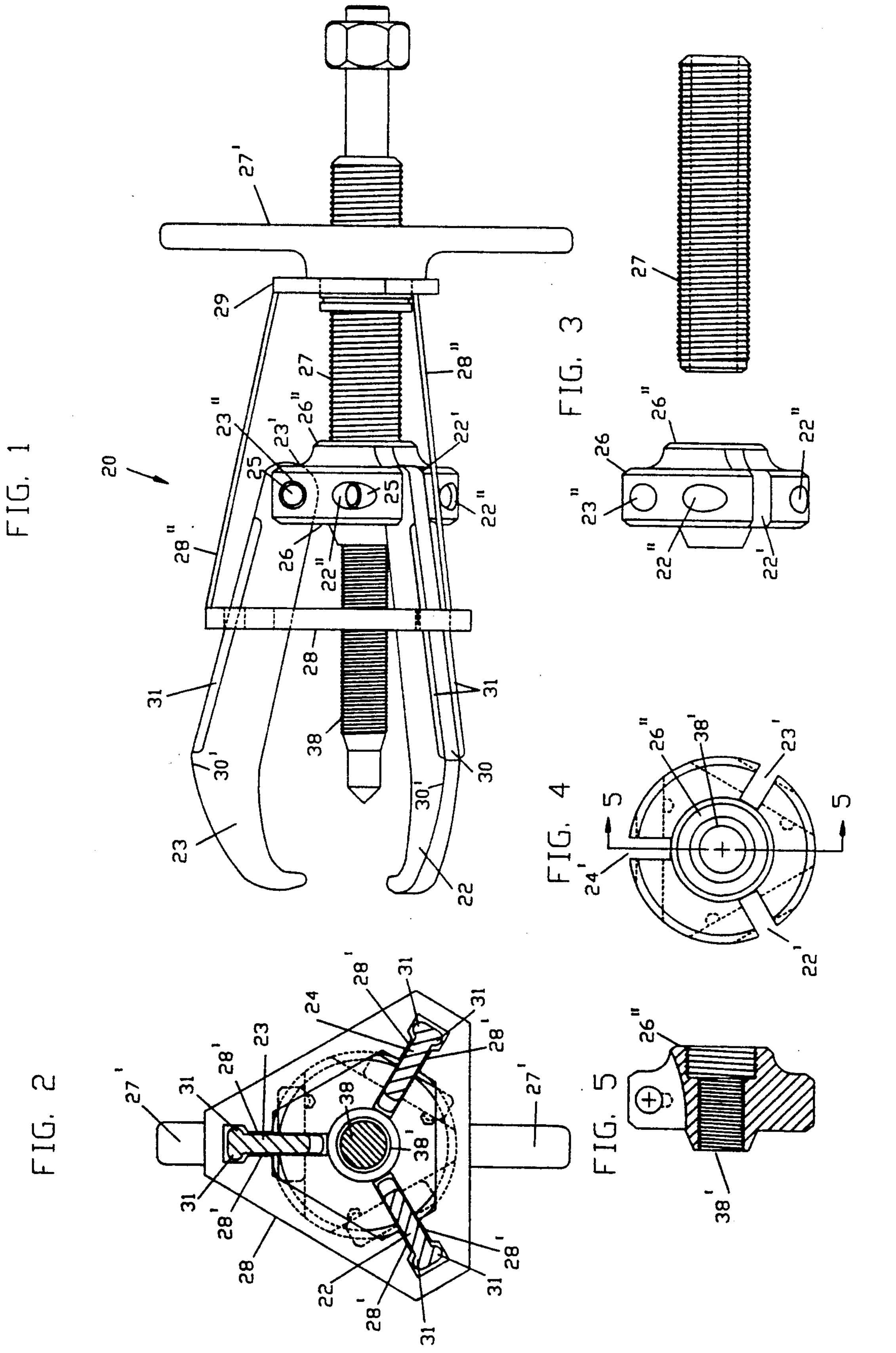
FIG. 1 is a side elevational view of the locking puller device wherein the collar is a flange-less, disk-like structure with a receiving member extending rearwardly from the collar, wherein the jaws are rearwardly and rotatably mounted in the slots of the collar, wherein the sleeve is threaded into the receiving member of the collar, and wherein the T-handle is threaded on the sleeve for movement along the sleeve to move the cam ring.
FIG. 2 is a cross-sectional view of the locking puller device taken along line 3—3 of FIG. 1.
FIG. 3 is a side elevational view of the collar and the sleeve removed from the collar.
FIG. 4 is a forward view of the flange-less, disk-like collar.
FIG. 5 is a cross-sectional view of the flange-less, disk-like collar taken along line 4—4 of FIG. 4.

Referring more particularly to the drawings in FIGS. 1, 2, 3, 4, and 5 the locking puller device 20 is illustrated as having a flange-less, disk-like collar 26 with a substantially circular, ridge-like receiving member 26'' which is symmetrical about the axis of the collar and which projects rearwardly from the collar 26, with three axial slots 22', 23', and 24' extending into its side and portions of its rearward and forward ends, and with three passages 22'', 23'', and 24'', each extending through the wall of the collar and intersecting one slot; having a threaded sleeve 27 which is threaded into the receiving member 26'' of the collar 26; and having a T-handle 27' threaded on the sleeve 27 for movement forward and rearward along the sleeve 27. The locking puller device operates identically to that described in the patents, U.S. Pat. Nos. 4,007,535 and 4,068,365. FIGS. 1 and 2 illustrates that the locking puller device has three arm-like jaws 22, 23, and 24 rearwardly and rotatably mounted at three rearward ends in the three slots 22', 23', and 24' of the collar 26 using three pins 25 inserted through the three passages 22'', 23'', and 24'' in the collar 26. The collar 26 has a substantially circular ridge-like receiving member 26'' which is symmetrical about the axis of the collar 26 and dimensionally smaller than the collar 26 and which integrally protrudes rearwardly from the collar 26. FIGS. 1, 2, and 3 illustrates that a threaded sleeve 27 is threaded into the receiving member 26''. FIG. 3 illustrates that the sleeve 27 can be removed and separated from the collar 26 by turning the sleeve 27 out of the receiving member 26''. The collar 26 further has a threaded bore 38' extending axially through thereof. A threaded rod 38 is threaded through the bore 38' of the collar 26 and extends through the sleeve 27. The T-handle 27' is threaded on the sleeve 27 for forward and rearward movement along the sleeve 27. A ring 29 is rotatably mounted to the T-handle 27'. Three elongated braces 28'', each of which has one end attached to the ring 29, extend forward and have there other ends attached to a cam ring 28. The cam ring 28 has three pairs of lugs 28' extending radially inwardly. The cam ring 28 surrounds the three arm-like jaws 22, 23, and 24. Each of the arm-like jaws 22, 23, and 24 has an outer surface 30 on which the cam ring 28 is slidable. each outer surface 30 has longitudinal outer edges 30'. On each edge of each outer surface 30, there is a rail 31 which extends laterally from and longitudinally along thereof. Each rail 31 is slidably positioned between a portion of the cam ring 28 and a lug 28'.

To remove gears, bearings, or races out of bearings or the like, the locking puller device is positioned before the object to be removed with the threaded rod 38 being in alignment with the shaft of the object. The arm-like jaws 22, 23, and 24 are spread by turning out the T-handle 27' so that the T-handle 27' moves rearwardly. As the T-handle 27' is turned out, the ring 29 and the cam ring 28 are urged rearwardly. The cam ring 28 moves along the outer surfaces 30 of the jaws 22, 23, and 24 with the lugs 28' slidably engaging the inner surfaces of the rails 31. The lugs 28' urges the arm-like jaws 22, 23, and 24 apart.

To lock the arm-like jaws 22, 23, and 24 about the object to be removed from the shaft, the forward tips of the arm-like jaws are positioned about the object, and the T-handle 27' is manually turned forward, urging the ring 29 and cam ring 28 forward with the cam ring 28 slidably engaging the outer surfaces 30 of the arm-like jaws 22, 23, and 24 and camming the arm-like jaws 22, 23, and 24 inwardly and locking the arm-like jaws 22, 23, and 24 about the object.

To remove the object from the shaft, the threaded rod 38 is turned forward engaging the shaft. The forward turning of the threaded rod 38 urges rearward movement of the arm-like jaws 22, 23, and 24 and the object relative to the shaft. The threaded rod 38 is turned forward until the object is removed from the shaft. The force and stress placed on the sleeve 27 and collar 26 of the locking puller device is enormous as the threaded rod 38 is turned forward engaging the shaft. The disk-like collar 26 and the sleeve 27 threaded into the receiving member 26" of the collar 26 are able to withstand that force and stress much better than the old collar having the flanges extending therefrom and the old sleeve which was fixed to the collar. The stress and force placed on the old collar and old sleeve would cause fatigue at the joint of the collar and sleeve and cause fatigue at the joint of the flange and collar; whereas, in the present invention, since the arm-like jaws are mounted into slots in the collar, there are no appendages extending from the collar and no joints of which can fatigue, thereby causing the appendages to break off.

It will be obvious that various changes and departures may be made to the invention without departing from the spirit and scope thereof. Accordingly, it is not intended that the invention be limited to that specifically described in the specification or as illustrated in the drawing but only as set forth in the claims.

What is claimed is:

1. An improved locking puller device of the type in which a plurality of arm-like jaws, each of which has an outer surface with rails extending laterally from and longitudinally along outer edges of said outer surface and is tapered forwardly and downwardly relative to the movement of a cam ring which surrounds said arm-like jaws, are movable toward each other and are lockable about an object as said cam ring is moved forwardly and cams said jaws inwardly, in which a threaded rod is movable forwardly to engage a shaft to urge rearward movement of said jaws relative to the shaft to remove the object from the shaft, in which said cam ring has a plurality of lugs extending radially inwardly so that said rails are slidably positioned between a portion of said cam ring and said lugs, in which a plurality of braces each of which has one end attached to said cam ring and the other end extending rearwardly and attached to a ring, and in which said arm-like jaws automatically spread as said cam ring is moved rearwardly causing said lug means to engage an inner surface of said rails, wherein the improvement comprises:

a collar having a flange-less, disk-like body, said collar having a plurality of axial slots extending therein, said slots substantially equally spaced about said collar, said arm-like jaws rearwardly and pivotally mounted in said slots, said collar further having a plurality of passages extending through its wall, each said passage intersecting one said slot for receiving a pin to mount one said arm-like jaw in said slot, said collar having a substantially circular, ridge-like receiving member which is symmetrical about the axis of said collar and which is dimensionally smaller than said collar and which integrally projects rearwardly from said collar, to support and add locking strength to said arm-like jaws and to reduce stress on said collar, caused from locking said arm-like jaws about and pulling the object, a sleeve threaded into and separatable from said receiving member of said collar, to provide more leverage when said arm-like jaws are locked about the object, to lessen fatigue at the joint of said collar and said sleeve, and to allow separable replacement of said sleeve from said collar, a T-handle threaded on said sleeve for tool-less manual forward and rearward movement of said ring and said cam ring.

* * * * *